United States Patent [19]
Davis

[11] 3,890,235
[45] June 17, 1975

[54] VACUUM FILTER

[75] Inventor: Steven S. Davis, Bountiful, Utah

[73] Assignee: Envirotech Corporation, Menlo Park, Calif.

[22] Filed: July 22, 1974

[21] Appl. No.: 490,651

Related U.S. Application Data

[63] Continuation-in-part of Ser. No. 275,513, July 27, 1972, Pat. No. 3,825,124.

[52] U.S. Cl................. 210/330; 210/333; 210/402
[51] Int. Cl............................................. B01d 33/34
[58] Field of Search............ 210/330, 333, 402, 345

[56] References Cited
UNITED STATES PATENTS

| | | | |
|---|---|---|---|
| 519,275 | 5/1894 | Sellenscheidt et al. | 210/345 |
| 1,878,998 | 9/1932 | Akins | 210/330 X |

*Primary Examiner*—Frank A. Spear, Jr.
*Attorney, Agent, or Firm*—Robert R. Finch

[57] ABSTRACT

An open frame rotary cylindrical filter construction is disclosed in which the rotary element is formed from a plurality of individual concave filter sectors mounted radially about a central hub. Each sector includes an elongated cone shaped basket or cup having an open mouth at its outer or base end and a restricted outlet opening inwardly from its apex. A flange is formed about the mouth of the sector and the sectors are held in place by tie rods extending radially from the hub to engage the flanges to pull the sectors toward the hub. The apex of each sector is pulled into sealing relationship with a drainage conduit leading to a filter valve at one end of the structure. The flanges of adjacent sectors combine to form a cylindrical structure supported by the tie rods and drainage conduits. Usual trunnions are provided at each end for journalling the structure for rotation.

2 Claims, 5 Drawing Figures

PATENTED JUN 17 1975　　　　　　　　　　　　　　3,890,235

SHEET　　　2

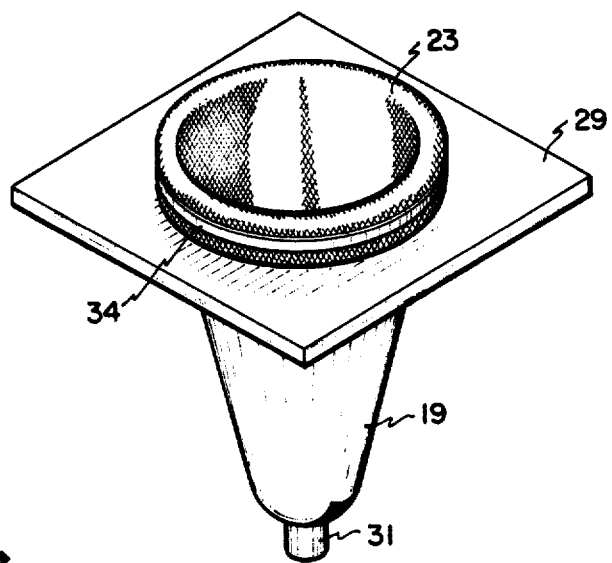
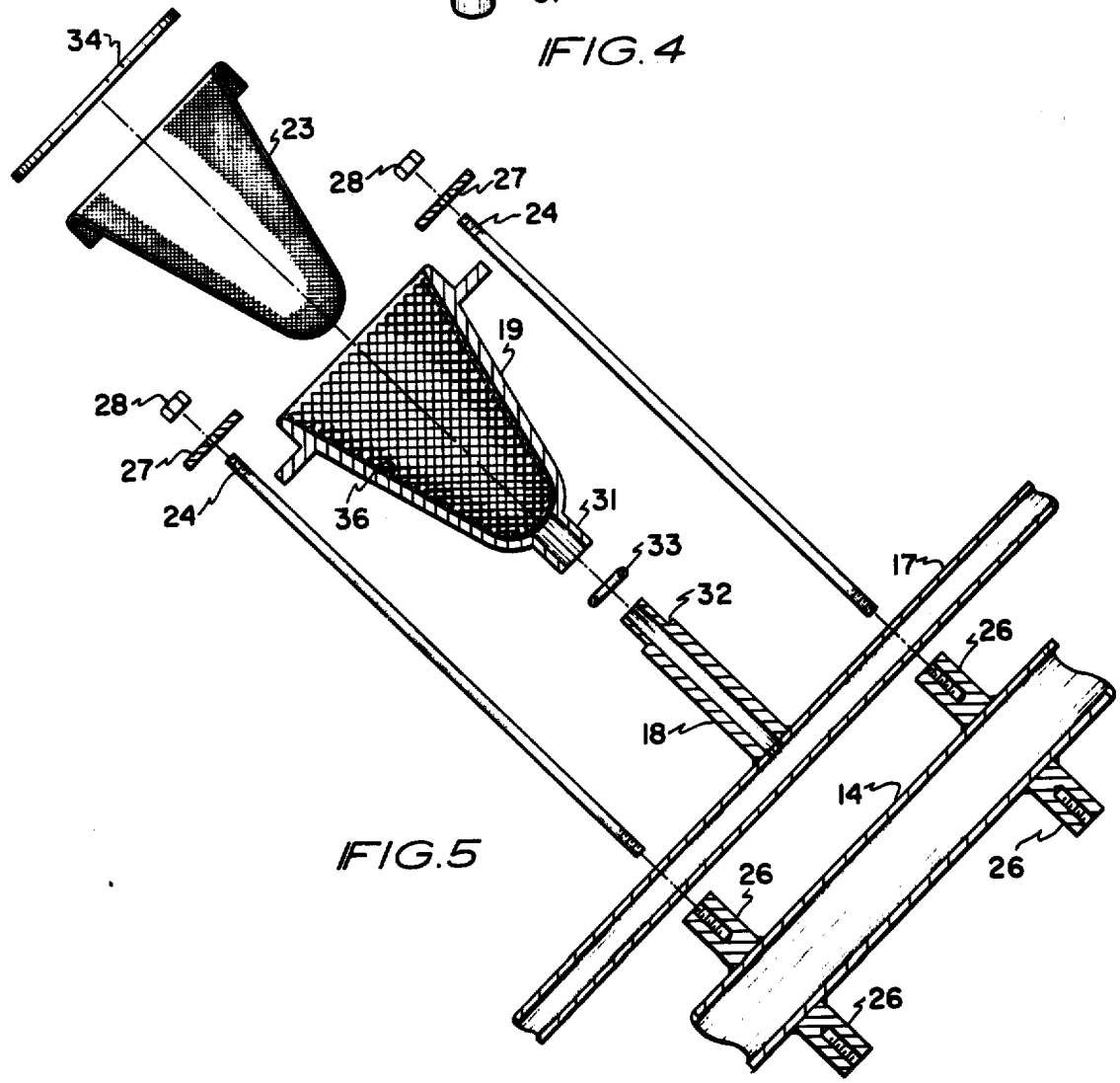

{ 3,890,235 }

VACUUM FILTER

RELATION TO OTHER APPLICATIONS

This is a continuation in part of my co-pending application Ser. No. 275,513 filed July 27, 1972 for Filter Elements for Continuous Filters, now U.S. Pat. No. 3,825,124 issued July 23, 1974.

BACKGROUND AND SUMMARY OF THE INVENTION

The present invention relates to continuous rotary vacuum filters in which a drum is mounted for rotation in a tank to which a continuous supply of material to be filtered is supplied. Filtration is effected by the application of vacuum to the drum surface as the drum rotates through the slurry whereby cake deposits on the surface of a filter medium stretched over the drum.

In my said co-pending application, an improved filter construction is disclosed in which the filter sectors are formed as individual concave vessels or cups extending inwardly of the drum surface, and the filter medium is a concave sock-like form secured to the open mouth of the concave element so that when vacuum is applied to the interior of the vessel, the filter medium sock is drawn into the vessel, and, for discharge, vacuum is released and pressure applied to evert the sock.

The present invention provides an improved construction for filters embodying the invention of my said co-pending application in which instead of the usual closed drum construction, the rotary filter element is formed from a plurality of concave filter sectors held together as a cylindrical wall secured concentrically about a hub by means of radial tie rods. In such construction, the rotary filter element may be open ended. Also, the individual conduits and connections by which the separate filter sectors communicate with the filter valve are readily accessible for maintenance, repair and replacement. The resulting construction is lower in initial cost and expense of maintenance than is a conventional drum.

The primary features and objectives of the present invention will become more apparent by reference to the appended drawings and the following description thereof which are offered by way of example only and not in limitation of the invention the scope of which is defined by the appended claims which include equivalents thereof.

BRIEF DESCRIPTION OF THE DRAWINGS

FIG. 4 is a perspective view of one of the individual filter sectors embodied in the filter illustrated in FIGS. 1 – 3.

FIG. 5 is an exploded side sectional view of one of the filter sector assemblies.

DETAILED DESCRIPTION OF THE DRAWINGS

Figure 1:
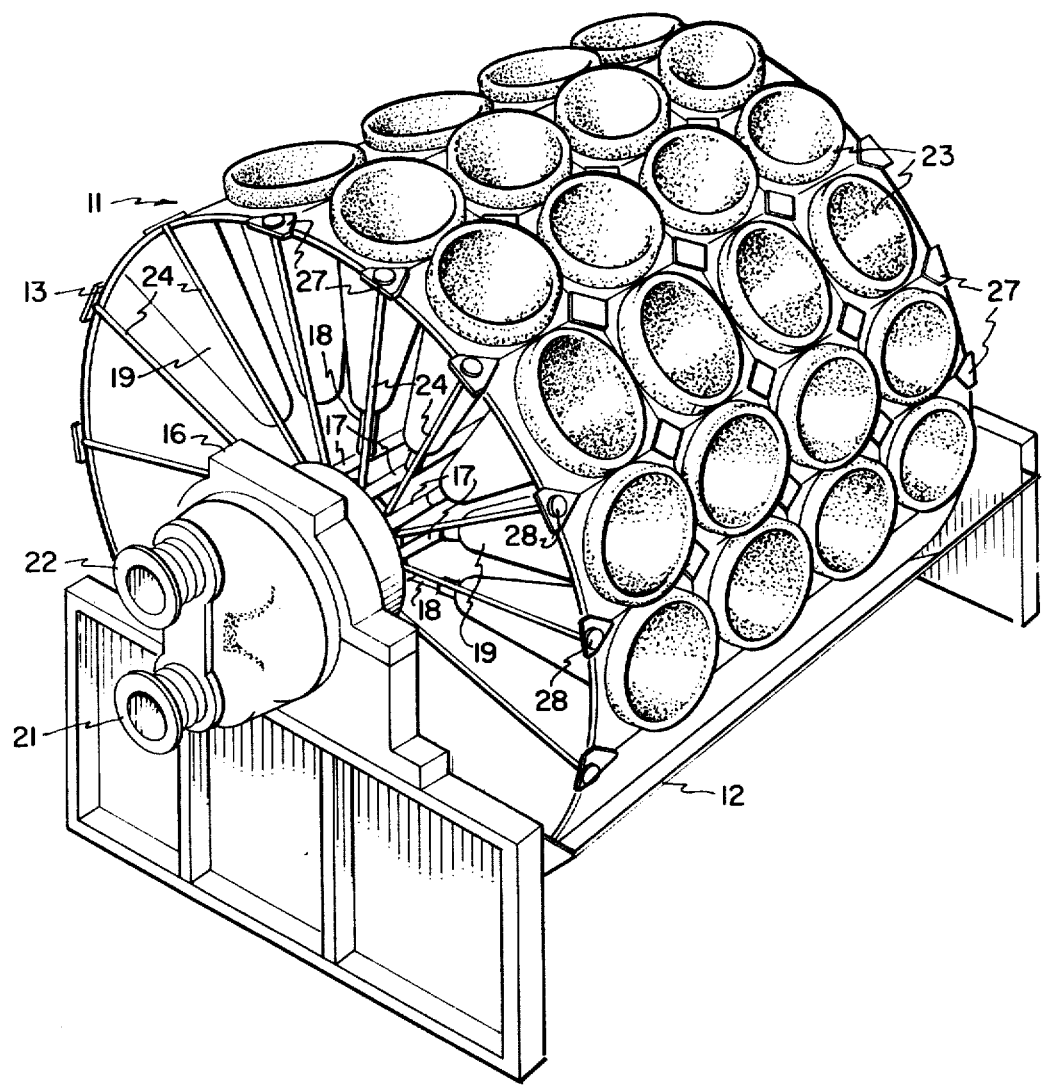
FIG. 1 is a perspective view of a rotary vacuum filter embodying the invention.
Figure 2:
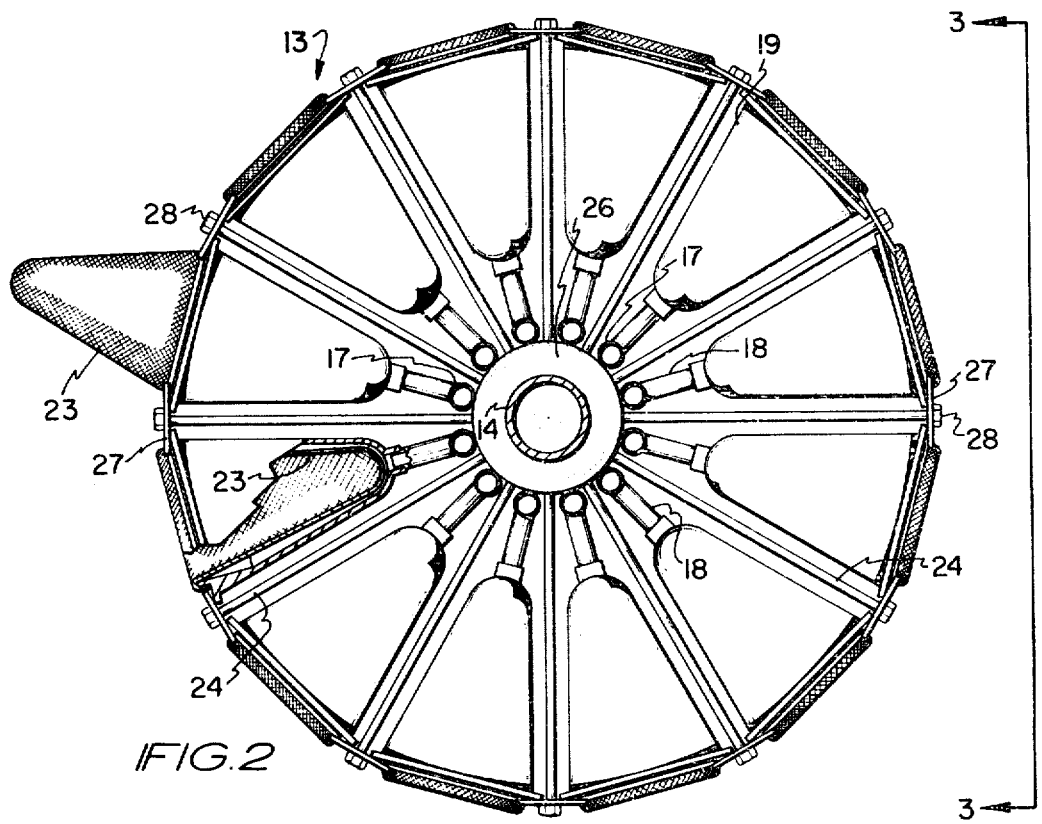
FIG. 2 is a sectional end view of the rotary filter element shown in FIGS. 1 and 3.
Figure 3:
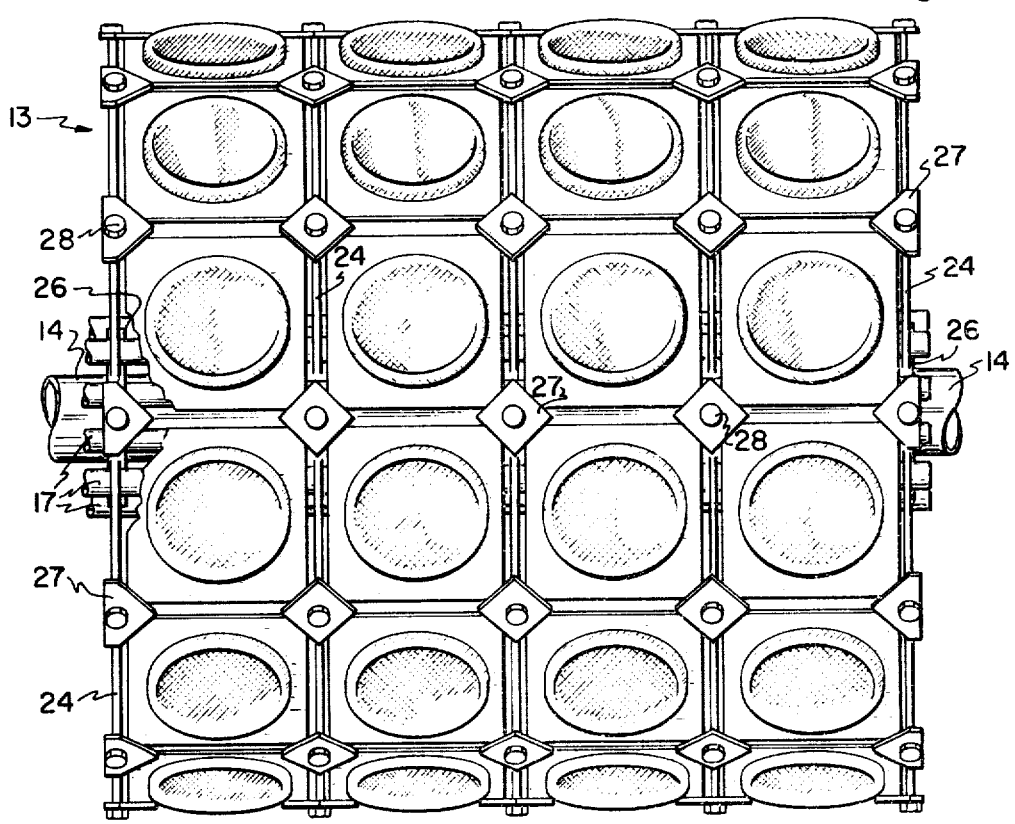
FIG. 3 is a front elevational view of the rotary filter element constructed according to the invention, taken as looking in the direction of arrows 3 of FIG. 2.

The illustrated embodiment is of a vacuum filter 11 which comprises a tank 12 in which is mounted a generally cylindrical filter element 13 journalled for rotation therein by suitable trunnions 14 one of which terminates in a conventional filter valve 16 which accepts filtrate withdrawn through suitable conduits 18 connected between the manifold 17 and the individual concave filter sector vessels 19. As shown, a bank of adjacent sectors 19 connect to the same manifold which up on rotation of the cylindrical element 13 by drive means, not shown, communicate successively through valve outlet 21 to any convenient source of vacuum, not shown, for cake formation in the vessels during submergence and, through valve inlet 22, to a source of pressured air or other fluid to effect cake discharge by everting the concave filter medium sock 23 as shown at the left side of FIG. 2. As in the construction disclosed in my parent case, U.S. Pat. No. 3,825,124, the vessel and filter sock have a depth greater than their diameter or other maximum dimension. It is from this construction that the advantage of increased filtration capacity is achieved.

The simplified cylindrical rotary filter element 13 is formed as an open structure comprising a plurality of complete filter sector assemblies each of which, as shown in FIG. 5, comprises a vessel 19 held in place by radial tie rods 24 threaded at their inner ends into threaded bores 26 on the central trunnion 14 and having at their outer ends clamp plates 27 which are held against the flange or shoulder 29 of the sector 19 by nuts 28. A stub conduit 31 extends from the apex or inner end of the vessel 19 and connects at its other end concentrically about the free end of and against the shoulder 32 on the conduit 18. An O ring 33 is fitted over the reduced end of the conduit 18 to be compressed between the shoulder 32 and the stub conduit 31 by the clamp plates 27 thereby providing a sealed connection between the vessel 19 and the withdrawal conduit 18 whereby vacuum and pressure may be applied to the interior of the vessel as the associated manifold rotates past the proper port in the filter valve.

As most clearly shown in FIG. 5, each filter sector includes also a concave filter medium 23 formed as a sock with one open end which fits over the open mouth of the sector and is held in place by a suitable clamp 34. To enhance application of vacuum and pressure uniformly to the filter medium, an interior pervious support 36, which may be a rigid screen, is provided inside and spaced from the inner wall of the vessel thus defining a plenum chamber surrounding the filter medium.

A filter construction according to the invention possesses several significant advantages. It is simplified and less expensive in initial construction because, inter alia, the need for and cost of the closed end drum is eliminated yet the cylindrical filter element is retained. Also, individual sectors may be readily removed for repair or replacement, and simple visual inspection of the piping system is possible whereby defects may be readily located and corrected.

It will be appreciated also that the filter construction of the invention, being modular, permits variation of the effective filter area simply by variation of the number of filter sectors employed. Thus, the drum may be only one sector wide and the number of sectors included in that single width may also be varied. Obviously, if a sector is removed, its associated conduits must be plugged. Depending upon the situation, the applied vacuum (air flow) per sector may be allowed to vary with the changes to the number of sectors involved or the total vacuum may be changed to maintain a constant vacuum on each sector.

I claim:

1. A rotary vacuum filter of the type including a tank for holding a slurry to be filtered, a rotary filter element including a plurality of filter sectors and mounted for rotation in said tank whereby said sectors pass successively into and out of submergence in said slurry, a valve and associated conduits for applying vacuum to the interior of each of said sectors during submergence and for supplying pressured fluid to the interior of said sector after emergence; the improvement in which said rotary filter element comprises a substantially cylindrical member having an elongated axial hub and an outer wall formed from a plurality of separate filter sectors each of which comprises a relatively deep concave vessel having an outwardly facing open mouth at one end and a relatively small opening in its wall remote from said open mouth, all of said vessels being spaced radially and concentrically about said hub, a plurality of conduits including a conduit extending between said relatively small opening of each of said vessels and said valve, clamp means securing all of said vessels in said spaced radial and concentric position about said hub with the outwardly facing open mouths of said sectors lying in a substantially cylindrical surface of revolution an elongated concave flexible filter medium associated with each of said vessels each of said filter mediums having one open end, and means associated with each of said vessels for securing the open end of one of said filter mediums to the open mouth of said vessel whereby said medium may be pulled into said vessel when vacuum is applied thereto and everted when pressured fluid is applied thereto.

2. A filter according to claim 1 in which said relatively small opening in the walls of said vessels is located at the inward ends thereof and said conduits extending between said openings and said valve include a plurality of manifolds arranged concentrically about and parallel to the axis of said hub, a plurality of said vessels are arranged radially of said hub and each of said manifolds, and all of said vessels radial to a given manifold are connected thereto.

* * * * *